(12) United States Patent
Kounavis et al.

(10) Patent No.: US 7,826,612 B2
(45) Date of Patent: Nov. 2, 2010

(54) SYSTEM, METHOD AND APPARATUS FOR AN INCREMENTAL MODULAR PROCESS INCLUDING MODULAR MULTIPLICATION AND MODULAR EDUCTION

(75) Inventors: Michael E. Kounavis, Hillsboro, OR (US); Arun Raghunath, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 11/479,824

(22) Filed: Jun. 29, 2006

(65) Prior Publication Data
US 2008/0025502 A1 Jan. 31, 2008

(51) Int. Cl.
*H04L 9/00* (2006.01)
(52) U.S. Cl. .................. 380/28; 708/491
(58) Field of Classification Search .......... None
See application file for complete search history.

(56) References Cited

U.S. PATENT DOCUMENTS

| | | | |
|---|---|---|---|
| 5,373,560 A * | 12/1994 | Schlafly | 380/30 |
| 6,282,290 B1 * | 8/2001 | Powell et al. | 380/28 |
| 6,748,410 B1 * | 6/2004 | Gressel et al. | 708/491 |
| 6,925,563 B1 * | 8/2005 | Jennings | 713/174 |
| 2002/0161810 A1 * | 10/2002 | Mellott et al. | 708/491 |
| 2004/0019622 A1 * | 1/2004 | Elbe et al. | 708/492 |
| 2004/0105541 A1 * | 6/2004 | Elbe et al. | 380/28 |
| 2005/0038845 A1 * | 2/2005 | Fischer | 708/650 |

* cited by examiner

*Primary Examiner*—Gilberto Barron, Jr.
*Assistant Examiner*—Shaun Gregory
(74) *Attorney, Agent, or Firm*—Blakely, Sokoloff, Taylor & Zafman LLP (57) ABSTRACT

A computer connected to a memory. The computer to execute an encryption program in the memory. The encryption program including an incremental modular multiplication portion to calculate a first product. The incremental modular multiplication portion to calculate a second product from a prefixed first product. A modular reduction portion to reduce the second product. The reduced second product is provided to a multiplication portion of the encryption program to generate encryption keys.

21 Claims, 5 Drawing Sheets

SYSTEM, METHOD AND APPARATUS FOR AN INCREMENTAL MODULAR PROCESS INCLUDING MODULAR MULTIPLICATION AND MODULAR EDUCTION

BACKGROUND

1. Field

The embodiments relate to cryptography, and in particular to cryptographic devices and processes using incremental modular multiplication with modular reduction without use of an integer multiplier.

2. Description of the Related Art

The Rivest Shamir & Adelman (RSA) algorithm for public key encryption is associated with significant processing cost at session establishment time due to the fact that it involves time consuming modular exponentiation operations. Modular exponentiation is the process of deriving the remainder from the division of a power of the input with a specified divisor. Modular exponentiation is time consuming in RSA implementations because the input, the power and the divisor are large numbers (i.e., they are expressed using many bits). For example, the input, the divisor and the power can be 512 bits long. To accelerate the calculation of modular exponents, RSA implementations deduce the calculation of modular exponents to the calculation of modular products and modular squares.

The RSA algorithm involves the calculation of a modular exponent in both the encryption and decryption processes. For example, on the decrypt side a plaintext P is derived from a ciphertext C as:

$$P = C^d \bmod N$$

The divisor N is the product of two prime numbers p and q and the decryption exponent d is the multiplicative inverse of the encryption exponent e mod $(p-1)(q-1)$. Using the Chinese remainder theorem (see, e.g., Wagon, S. "The Chinese Remainder Theorem." §8.4 in *Mathematica in Action*. New York: W. H. Freeman, pp. 260-263, 1991) one can show that the decryption process can be deduced to the calculation of two smaller modular exponents:

$$P = (q^{-1} \bmod p) \cdot (C^{d_p} \bmod p - C^{d_q} \bmod q) \bmod p \cdot q + C^{d_q} \bmod q$$

where:

$$d_p = e^{-1} \bmod (p-1)$$

and $$d_q = e^{-1} \bmod (q-1)$$

The calculation of each of the two modular exponents on the decrypt side and of the modular exponent on the encrypt side can be deduced to the calculation of a number of modular products and modular squares, using the 'square-and-multiply' technique. Suppose that $d = [d_k \, d_{k-1} \ldots d_1]$.

To calculate a modular product or a modular square, most RSA implementations use the popular Montgomery algorithm (P. L. Montgomery, *Modular Multiplication Without Trial Division*, Math. Computation, 44: 519-521, 1985). The Montgomery algorithm is slow, however, because it visits every bit of its input twice and performs 3-4 long operations (i.e., input-wide operations) for every bit of the input. Further, the Montgomery algorithm is also slow because it creates mathematical structure for deriving the remainder easily. The Montgomery algorithm adds the divisor into the input product as many times needed in order for the least half of its input to be zero. In this way the final remainder can be computed after two passes on the input are complete.

The Montgomery algorithm accepts as input two numbers X and Y each of length k in bits and a divisor N and returns the number $Z = X \cdot Y \cdot 2^{-k} \bmod N$. In order for the algorithm to work, the numbers N and $2^k$ must be relatively prime. For the derivation of the modular product $W = X \cdot Y \bmod N$ two Montgomery passes are needed: one for calculating the intermediate number $Z = X \cdot Y \cdot 2^{-k} \bmod N$ and one for calculating the final product W as $W = Z \cdot 2^{2k} \cdot 2^{-k} \bmod N$.

For modular reduction, many cryptographic processes uses Barrett's algorithm (P. D. Barrett. "Implementing the Rivest Shamir and Adleman public key encryption algorithm on a standard digital signal processor" *Advances in Cryptology, Proceedings of Crypto '86*, LNCS 263, A. M. Odlyzko, Ed. Springer-Verlag, 1987, pp. 311-323). Modular exponentiation involves repeatedly performing the modular reduction operation, which is a very costly operation as it requires integer multiplication.

BRIEF DESCRIPTION OF THE DRAWINGS

The embodiments are illustrated by way of example, and not by way of limitation, in the figures of the accompanying drawings and in which like reference numerals refer to similar elements and in which.

DETAILED DESCRIPTION

The embodiments discussed herein generally relate to apparatus, system and method for cryptography using incremental modular multiplication with modular reduction without use of an integer multiplier. Referring to the figures, exemplary embodiments will now be described. The exemplary embodiments are provided to illustrate the embodiments and should not be construed as limiting the scope of the embodiments.

Figure 1:
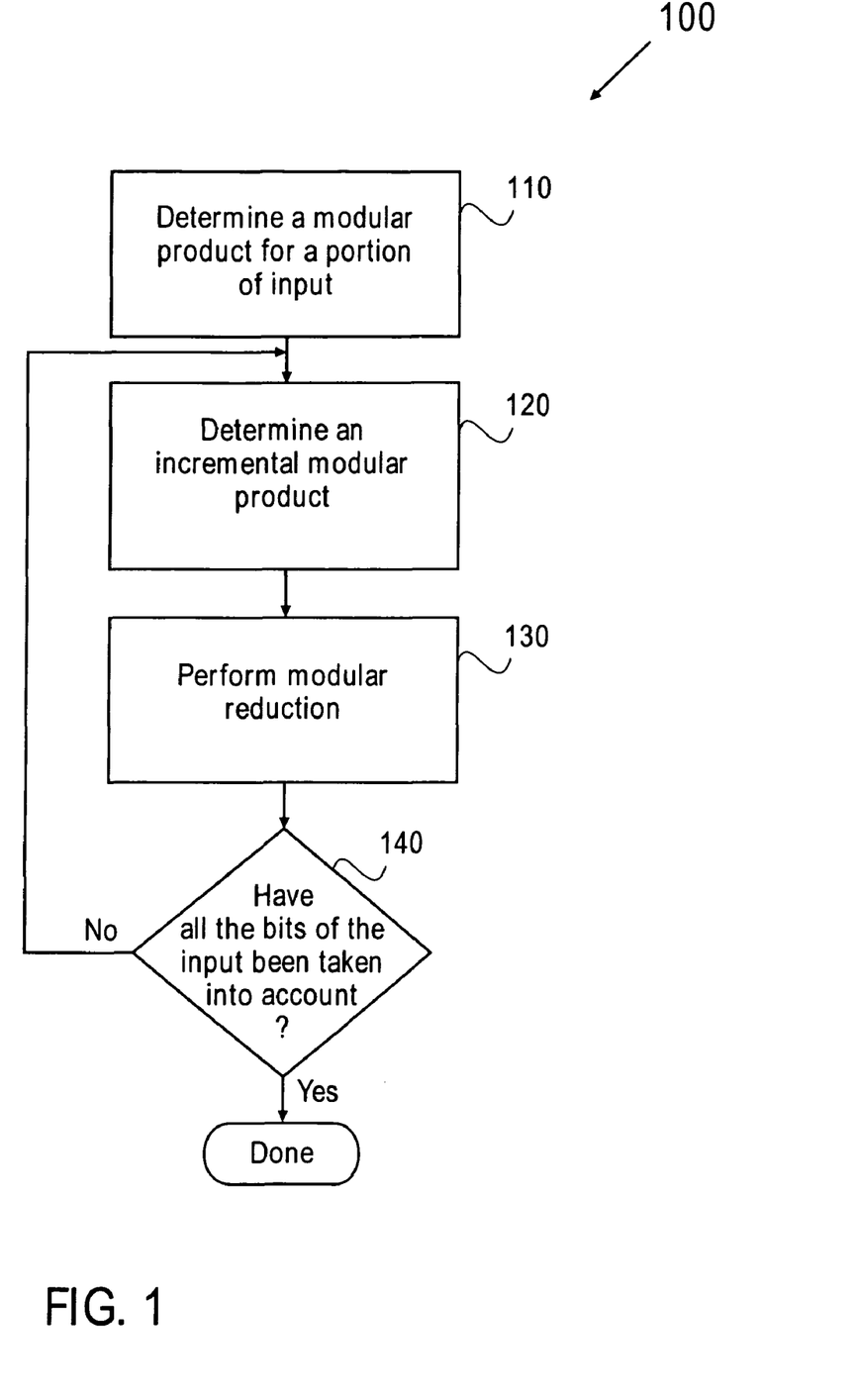
FIG. 1 illustrates a block diagram of a process of an embodiment.

FIG. 1 illustrates a block diagram of a process of an embodiment. In block 110, a modular product is determined for the least significant half of an input operand. In block 120, the input operand is prefixed with a set of selected bits and an incremental modular product is determined. In one embodiment, a dependency exists between two modular products when the second product results from the first by prefixing its input with a few bits. This dependency is used for calculating an incremental modular product when a basic product and an increment are known. The number of long (i.e., input-wide) operations involved in calculating an incremental modular product is just a few. In this embodiment not every bit of the input is visited. Instead, this embodiment calculates a modular product for the least significant half of the input once (block 110), and based on this number, it performs incremental updates on the final result visiting only the remaining non-zero most significant bits of the input once.

In one embodiment bit-by-bit incremental modular products are determined in block 120. In another embodiment optimization is realized by calculating incremental modular products on a word-by-word basis as opposed to bit-by-bit.

Word-by-word determination of incremental modular products also reduces the cache footprint required by a modified RSA. In yet another embodiment, the incremental determination of modular products can be applied to any public key encryption scheme or any key exchange algorithm that uses modular exponentiation and modular products. For example, the determination of incremental modular products can be applied to the acceleration of ElGamal (Taher ElGamal, "A Public-Key Cryptosystem and a Signature Scheme Based on Discrete Logarithms", IEEE Transactions on Information Theory, v. IT-31, n. 4, 1985, pp 469-472 or CRYPTO 84, pp 10-18, Springer-Verlag), Digital Signature Algorithm (DSA; see U.S. Pat. No. 5,231,668) and the Diffie-Hellman algorithm (*New Directions in Cryptography* W. Diffie and M. E. Hellman, IEEE Transactions on Information Theory, vol. IT-22, November 1976, pp: 644-654).

In one embodiment a modular product of the form $X \cdot Y$ mod N can be found in an alternative way, which can be implemented more efficiently than the Montgomery algorithm. The process of incremental modular determination is defined as Incremental Modular Multiplication ($IM^2$) or Products (IMP). In one embodiment it is determined that a mathematical relationship exists between two modular products when the second product results from the first by prefixing its input with a few bits. As a result, if a modular product is known, an incremental modular product can be determined with a few long (i.e., input-wide) operations. In one embodiment additions and multiplications between numbers generate carries. In other embodiments additions and multiplications are carry-less.

In one embodiment modular square and multiply operations are determined as follows. Assume that a binary number M is of length m in bits and that another number $M^+$ results from M by prefixing M with a single bit equal to 1. Also assume that the modular square $M^2$ mod N is known. The modular square $M^{+2}$ mod N can be determined from $M^2$ mod as follows:

$$M^{+2} \mathrm{mod} N = (2^m + M)^2 \mathrm{mod} N = (2^{2m} + M^2 + 2^{m+1} M) \mathrm{mod} N$$

$$= (2^{2m} \mathrm{mod} N + M^2 \mathrm{mod} N + 2^{m+1} \cdot M \mathrm{mod} N) \mathrm{mod} N$$

This shows that the incremental modular square $M^{+2}$ mod N can be computed from the modular square $M^2$ mod N in a simple manner. In one embodiment, first, the remainder $2^{2m}$ mod N is pre-computed for all possible values of m and placed in a lookup table. Second, a number congruent to $2^{m+1} \cdot M$ mod N can be determined in a recursive way with only one long shift operation, one table lookup and one long addition. Next, m is replaced with m+1 and M with $M+2^m$ in the expression $2^{m+1} \cdot M$ to result with:

$$2^{m+2}(M+2^m)=2 \cdot 2^{m+1} \cdot M + 2^{2m+2}$$

Therefore, an incremental modular square requires 2 table lookups, 3 long additions, 1 long shift operation, and 1 modular reduction to complete. In one embodiment the incremental determination of a modular square is done by performing the modular reduction step in block 130, not on a bit-by-bit basis, but after an aggregate of bits have been taken into account. Thus, the cost of a single modular reduction can be amortized over several calculations. IMP can be further be optimized by storing the tables of pre-computed modular exponents in a fast cache memory unit. In this embodiment, case cache access latencies can be potentially hidden by the time required for other computations to complete. Taking into account all optimizations, the cost of the calculation of a single incremental modular square is approximately 4 long operations, which is similar to the cost of the Montgomery algorithm for a single bit. However, an incremental modular square determination does not need to visit every bit of the input, but only the non-zero most significant half once. In this way it is anticipated that an incremental modular square determination is almost four times faster than the Montgomery algorithm.

An incremental modular product can be calculated in a similar manner as a modular square. First, assume that two numbers X and Y of length m in bits, each for which it the value of the remainder $X \cdot Y$ mod N for some N is known. Also assume that $X^+ = 2^m + X$ and $Y^+ = 2^m + Y$ are two increments on X and Y respectively. The incremental modular product $X^+Y^+$ mod N can be determined from XY mod N as follows:

$$X^+ \cdot Y^+ \mathrm{mod} N = (2^m + X) \cdot (2^m + Y) \mathrm{mod} N$$

$$= (2^{2m} + X \cdot Y + 2^m (X+Y)) \mathrm{mod} N$$

$$= (2^{2m} \mathrm{mod} N + X \cdot Y \mathrm{mod} N + 2^m \cdot$$

$$(X+Y) \mathrm{mod} N) \mathrm{mod} N$$

Therefore, an incremental modular product requires 2 table lookups, 3 long additions, 1 long shift operation, and 1 modular reduction to complete. Taking into account all optimizations, the cost of the calculation of a single incremental modular product is approximately 4 long operations, which is similar to the cost of the Montgomery algorithm for a single bit. In yet another embodiment the determination of incremental modular products is further optimized to operate on a word-by-word basis as opposed to bit-by-bit.

In one embodiment two binary numbers X and Y are input and the modular product $X \cdot Y$ mod N for some N is returned. Assume that the length of the numbers X, Y and N is the same and is equal to K bits. Also, consider that the input numbers X and Y can be sliced into n slices $X_1, X_2, \ldots, X_n$ and $Y_1, Y_2, \ldots, Y_n$ such that $X=[X_n X_{n-1} \ldots X_1]$ and $Y=[Y_n Y_{n-1} \ldots Y_1]$. The length of slices $X_1$ and $Y_1$ is l bits, l<K, whereas the length of the slices $X_2, \ldots, X_k$ and $Y_2, \ldots, Y_k$ is w bits, w<l<K. Obviously $K=w \cdot (n-1)+l$. Also consider that K>21. In one embodiment the framework initializes three variables $X^{(1)}$ $Y^{(1)}$ and $P^{(1)}$ as follows:

$$X^{(1)}=2^l \cdot X_1 \mathrm{mod} N$$

$$Y^{(1)}=2^l \cdot Y_1 \mathrm{mod} N$$

$$P^{(1)}=X_1 \cdot Y_1$$

In each step k of this framework the process operates on the binary numbers $X^{(k-1)}$ $Y^{(k-1)}$ and $P^{(k-1)}$ produced in the previous step k−1 as follows: the numbers $X^{(k)}$ $Y^{(k)}$ and $P^{(k)}$ are produced from $X^{(k-1)}$ $Y^{(k-1)}$ and $P^{(k-1)}$;

$$X^{(k)}=X_k \cdot T_1^{(k)} + C_1 \cdot X^{(k-1)}$$

$$Y^{(k)}=Y_k \cdot T_1^{(k)} + C_1 \cdot Y^{(k-1)}$$

$$P^{(k)}=X_k \cdot Y_k \cdot T_2^{(k)} + P^{(k-1)} + X_k \cdot Y^{(k-1)} + Y_k \cdot X^{(k-1)}$$

The constant value $C_1$ is equal to $2^w$. The variable $T_1^{(k)}$ represents the k-th entry of a table $T_1$. The entries of table $T_1$ depend on the value of the private key only. Table $T_1$ is created before the beginning of an encryption process at preprocessing time and contains n K-bit entries. Each value $T_1^{(k)}$ is equal to:

$$T_1^{(k)} = 2^{2 \cdot l + (2 \cdot k - 3) \cdot w} \bmod N$$

Similarly, the variable $T_2^{(k)}$ represents the k-th entry of another table $T_2$. The entries of table $T_2$ depend on the value of the private key only, like the entries of $T_1$. Table $T_2$ is created before the beginning of the encryption process at preprocessing time and contains n K-bit entries. Each value $T_2^{(k)}$ is equal to:

$$T_2^{(k)} = 2^{2 \cdot l + (2 \cdot k - 4) \cdot w} \bmod N$$

If k is a multiple of an implementation parameter m, then the numbers $X^{(k)}$ $Y^{(k)}$ and $P^{(k)}$ are reduced mod N:

$$X^{(k)} \leftarrow X^{(k)} \bmod N$$

$$X^{(k)} \leftarrow X^{(k)} \bmod N$$

$$P^{(k)} \leftarrow P^{(k)} \bmod N$$

The parameter m represents the number of steps after which modular reduction is performed on the numbers $X^{(k)}$ $Y^{(k)}$ and $P^{(k)}$. The embodiment's framework requires a total of n steps to execute. In n/m of these steps modular reduction operations are performed. First assume that m divides n. In the last step n, no $X^{(n)}$ and $Y^{(n)}$ need to be determined. The value $P^{(n)}$ produced in the last step of the framework is the desired remainder:

$$P^{(n)} = X \cdot Y \bmod N$$

The number $P^{(k)}$ produced at step k of the framework is congruent (mod N) to the product of two numbers $X_k^a$ and $Y_k^a$. The numbers $X_k^a$ and $Y_k^a$ consist of all slices of X and Y which have been taken into account in steps 1 through k:

$$P^{(k)} \equiv X_k^a \cdot Y_k^a (\bmod N)$$

Where: $X_k^a = [X_k X_{k-1} \ldots X_1]$ and: $Y_k^a = [Y_k Y_{k-1} \ldots Y_1]$ A number a is 'congruent' to another number b given a specific divisor N if the divisor N divides the difference a−b.

$$a \equiv b \ (\bmod N) \Leftrightarrow a - b = c \cdot N \text{ for some } c$$

The value $P^{(n)}$ must be congruent to the product X·Y. Since the number $P^{(n)}$ is also reduced mod N in the last step this means that $P^{(n)}$ must be equal to X·Y mod N. To prove this, it is noted that he numbers $X^{(k)}$ and $Y^{(k)}$ produced at step k of the framework are congruent (mod N) to the numbers $X_k^a$ and $Y_k^a$ respectively, shifted to the left by as many bits as their length:

$$X^{(k)} \equiv 2^{l + (k-1) \cdot w} \cdot X_k^a (\bmod N)$$

and: $Y^{(k)} \equiv 2^{l + (k-1) \cdot w} \cdot Y_k^a (\bmod N)$

Since slices $X_1$ and $Y_1$ are l bits long and all other slices $X_2, \ldots, X_k$ and $Y_2, \ldots, Y_k$ are w bits long, it is evident that l+(k−1)w is the length of the numbers $X_k^a$ and $Y_k^a$ in bits. This is proved by the following. First, this holds for k=1. Then for some value k*, it also holds for k*+1. For k=1, the proof is straightforward:

$$X^{(1)} = 2^l \cdot x_1 \bmod N = 2^l \cdot X_1^a \bmod N$$

$$\Leftrightarrow 2^l \cdot X_1^a - X^{(1)} = c \cdot N$$

$$\Leftrightarrow X^{(1)} \equiv 2^l \cdot X_1^a (\bmod N)$$

where c is some integer. The proof for $Y^{(1)}$ is similar. Assume that the above holds for k=k*.

$$X^{(k^*)} \equiv 2^{l + (k^* - 1) \cdot w} \cdot X_{k^*}^a (\bmod N)$$

$$\Leftrightarrow X^{(k^*)} = 2^{l + (k^* - 1) \cdot w} \cdot X_{k^*}^a + c \cdot N$$

This also holds for k=k*+1.

$$X^{(k^*+1)} = X_{k^*+1} \cdot T_1^{(k^*+1)} + C_1 \cdot X^{(k^*)}$$
$$= \text{(from assumption)} \ X_{k^*+1} \cdot T_1^{(k^*+1)} +$$
$$C_1 \cdot 2^{l + (k^* - 1) \cdot w} \cdot X_{k^*}^a + C_1 \cdot c \cdot N$$
$$= 2^{2l + (2k - 1) \cdot w} \cdot X_{k^*+1} + 2^w \cdot 2^{l + (k^* - 1) \cdot w} \cdot X_{k^*}^a + C_2 \cdot N$$
$$= 2^{l + k^* \cdot w} \cdot (2^{l + (k^* - 1) \cdot w} \cdot X_{k^*+1} + X_{k^*}^a) + C_2 \cdot N$$
$$= 2^{l + k^* \cdot w} \cdot [X_{k^*+1} X_{k^*}^a] + C_2 \cdot N$$
$$= 2^{l + k^* \cdot w} X_{k^*+1}^a + C_2 \cdot N \Leftrightarrow X^{(k^*+1)} \equiv 2^{l + k^* \cdot w} \cdot X_{k^*+1}^a (\bmod N)$$

for some integer $C_2$. The proof for $Y^{(k^*+1)}$ is similar. For k=1:

$$P^{(1)} = \left. \begin{array}{l} X_1 \cdot Y_1 = X_1^a \cdot Y_1^a = \\ X_1^a \cdot Y_1^a X_1^a \cdot Y_1^a < N \end{array} \right\} P^{(1)} \equiv X_1^a \cdot Y_1^a \bmod N$$

$$P^{(k^*)} \equiv X_{k^*}^a \cdot Y_{k^*}^a (\bmod N) \Leftrightarrow P^{(k^*)} = X_{k^*}^a \cdot Y_{k^*}^a + c \cdot N$$

for some integer constant c. Also, $$P^{(k^*+1)} = X_{k^*+1} \cdot Y_{k^*+1} \cdot T_2^{(k^*+1)} + P^{(k^*)} + X_{k^*+1} \cdot Y^{(k^*)} +$$
$$Y_{k^*+1} \cdot X^{(k^*)} = \text{(from assumption)} X_{k^*+1} \cdot$$
$$Y_{k^*+1} \cdot T_2^{(k^*+1)} + X_{k^*}^a \cdot Y_{k^*}^a + X_{k^*+1} \cdot Y^{(k^*)} + Y_{k^*+1} \cdot X^{(k^*)} +$$
$$c \cdot N = 2^{2l + (2k^* - 2) \cdot w} \cdot X_{k^*+1} \cdot Y_{k^*+1} + X_{k^*}^a \cdot Y_{k^*}^a +$$
$$2^{l + (k^* - 1) \cdot w} \cdot X_{k^*+1} \cdot Y_{k^*}^a + 2^{l + (k^* - 1) \cdot w} \cdot Y_{k^*+1} \cdot X_{k^*}^a + C_2 \cdot N$$
$$= (2^{l + (k^* - 1) \cdot w} \cdot X_{k^*+1} + X_{k^*}^a) \cdot (2^{l + (k^* - 1) \cdot w} \cdot Y_{k^*+1} + Y_{k^*}^a) +$$
$$C_2 \cdot N = [X_{k^*+1} X_{k^*}^a] \cdot [Y_{k^*+1} Y_{k^*}^a] + C_2 \cdot N$$
$$= X_{k^*+1}^a \cdot Y_{k^*+1}^a + C_2 \cdot N \Leftrightarrow P^{(k^*+1)} \equiv X_{k^*+1}^a \cdot Y_{k^*+1}^a (\bmod N)$$

The above embodiment framework requires a total of n steps to execute where $$n = \frac{K - l}{w} + 1$$

Here, K is the length of each of the numbers X, Y and N in bits, l is the length of the least significant slices of X and Y and w is the length of all other slices of X and Y in bits. Therefore, by choosing appropriate values for l and w one the number of steps can be set to a desired value.

From the definition of the embodiment framework it is also evident that the calculation of the modular product X·Y mod N is split into two stages. The first stage (step 1) requires the calculation of a product between two potentially large numbers $X_1$ and $Y_1$. By 'large' numbers in this context we mean numbers which length is greater than the maximum length of input operands in a multiplication instruction. The second stage includes requires the determination of a number of incremental modular products. It can be seen that in the second stage, at least one argument in each multiplication operation has length no greater than w bits.

In what follows the term 'scalar' multiplication is used to refer to a multiplication operation that is implemented as a single instruction in a processor. In one embodiment w is chosen to be equal to the maximum length of input operands in a multiplication instruction. In this embodiment, the number of scalar multiplications required by stage 1 is equal to:

$$N_{mul}^{(1)} = \left(\frac{l}{w}\right)^2$$

Similarly the number of scalar multiplications required for the execution of stage 2 (steps 2–n) of the framework is:

$$N_{mul}^{(2,\ldots,n)} = (n-1) \cdot \left(\frac{6K}{w} + 3\right) = \frac{K-l}{w} \cdot \left(\frac{6K}{w} + 3\right)$$

In block 130, the execution of a number of reduction operations is performed. Block 140 determines if all the bits have been taken into account. If so, process 100 is complete. If not, process 100 continues with block 120. In one embodiment the number of modular reductions required is n/m. To determine the number of multiplication and addition operations required for each modular reduction it is necessary to determine the maximum length of the numbers $X^{(k)} Y^{(k)}$ and $P^{(k)}$ in each step of the framework. Assume that $\log_2(K/w) \ll w$. If this assumption is correct then after the execution of n steps the numbers $X^{(k)}$ and $Y^{(k)}$ become, in the worst case, K+2w bits long, whereas the number $P^{(k)}$ becomes, in the worst case, K+3w bits long. Using Barrett's algorithm (P. D. Barrett. "Implementng the Rivest Shamir and Adleman public key encryption algorithm on a standard digital signal processor" *Advances in Cryptology, Proceedings of Crypto '86*, LNCS 263, A. M. Odlyzko, Ed. Springer-Verlag, 1987, pp. 311-323) for modular reduction in the last step of the framework only (i.e., m=n) the number of multiplication operations involved in this reduction operation is:

$$N_{mul}^{(red)} = 2 \cdot \min\left(3, \frac{K}{w}\right) \cdot \frac{K}{w}.$$

This is because Barrett's reduction algorithm involves two multiplication operations between large numbers where one operand is at most K+3w bits long and the other operand is K bits long.

In one embodiment, block 130 uses high speed modular reduction without use of an integer multiplier. In this embodiment, process 100 'reads ahead' some fixed amount of bits and slices this data into smaller groups of bits. The slices are used for performing parallel lookups into different tables. The results from the table lookups are added and their sum is used for updating the value of the reduced big number. In order to reduce the table size needed, one embodiment uses the following basic property of modular reduction: (a+b) mod N=(a mod N+b mod N) mod N.

This embodiment accepts as input a big number x and a modulus m. In this embodiment, the remainder x mod m is returned. The number x is sliced into words. In one embodiment, although the process can work for any word size, as described below, it is assumed that the word size is 64 bits for the sake of simplicity. Assume that the modulus has a total size of k words and the input x has a size of n words:

$$x = [x_n x_{n-1} \ldots x_1], \ m = [m_k m_{k-1} \ldots m_1]. \quad (2)$$

Figure 2:
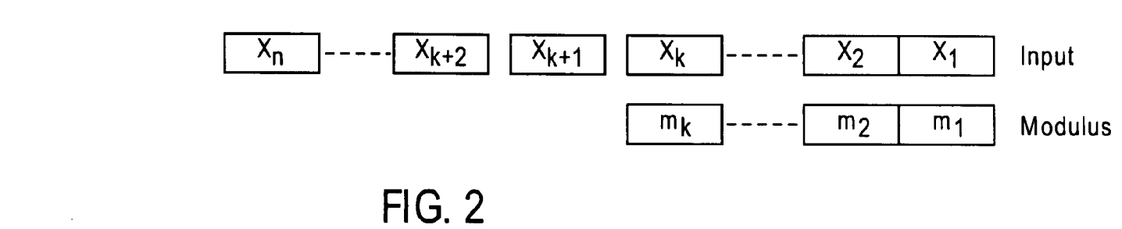
FIG. 2 illustrates inputs and modulus coefficients for an embodiment.
Figure 3:
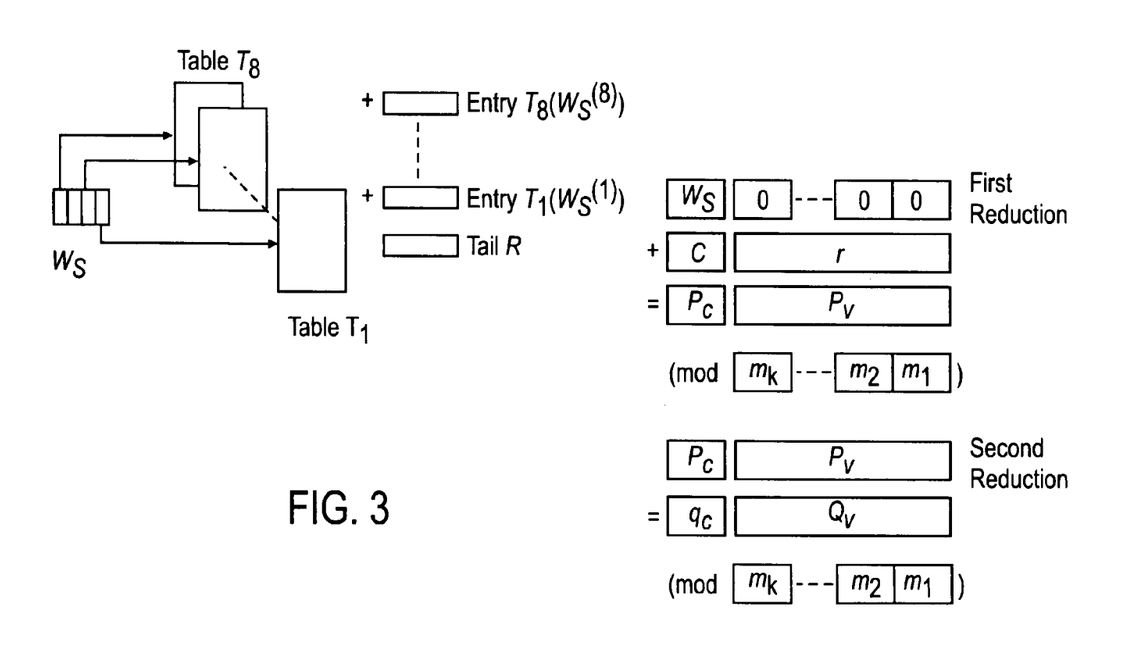
FIG. 3 illustrates a bit slicing process for an embodiment.
Figure 4:
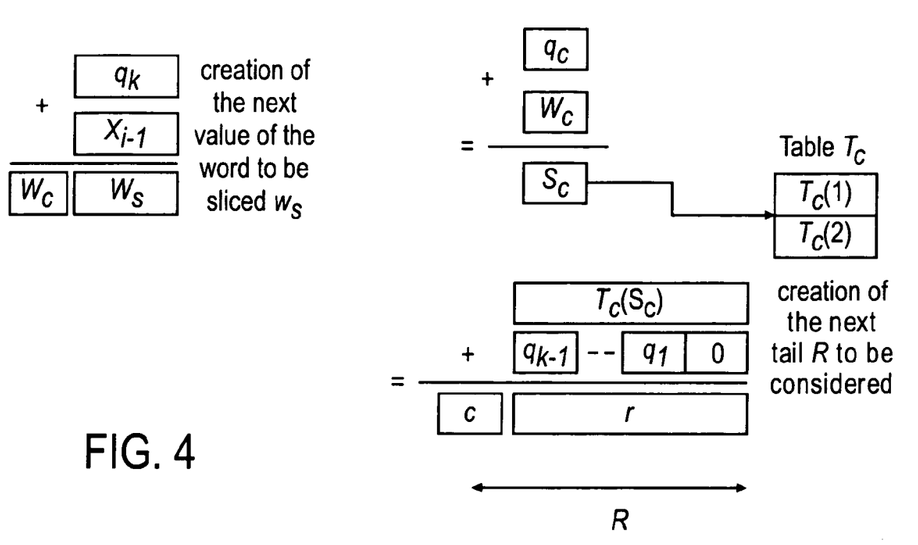
FIG. 4 illustrates a look-ahead carry propagation process for an embodiment.
Figure 5:
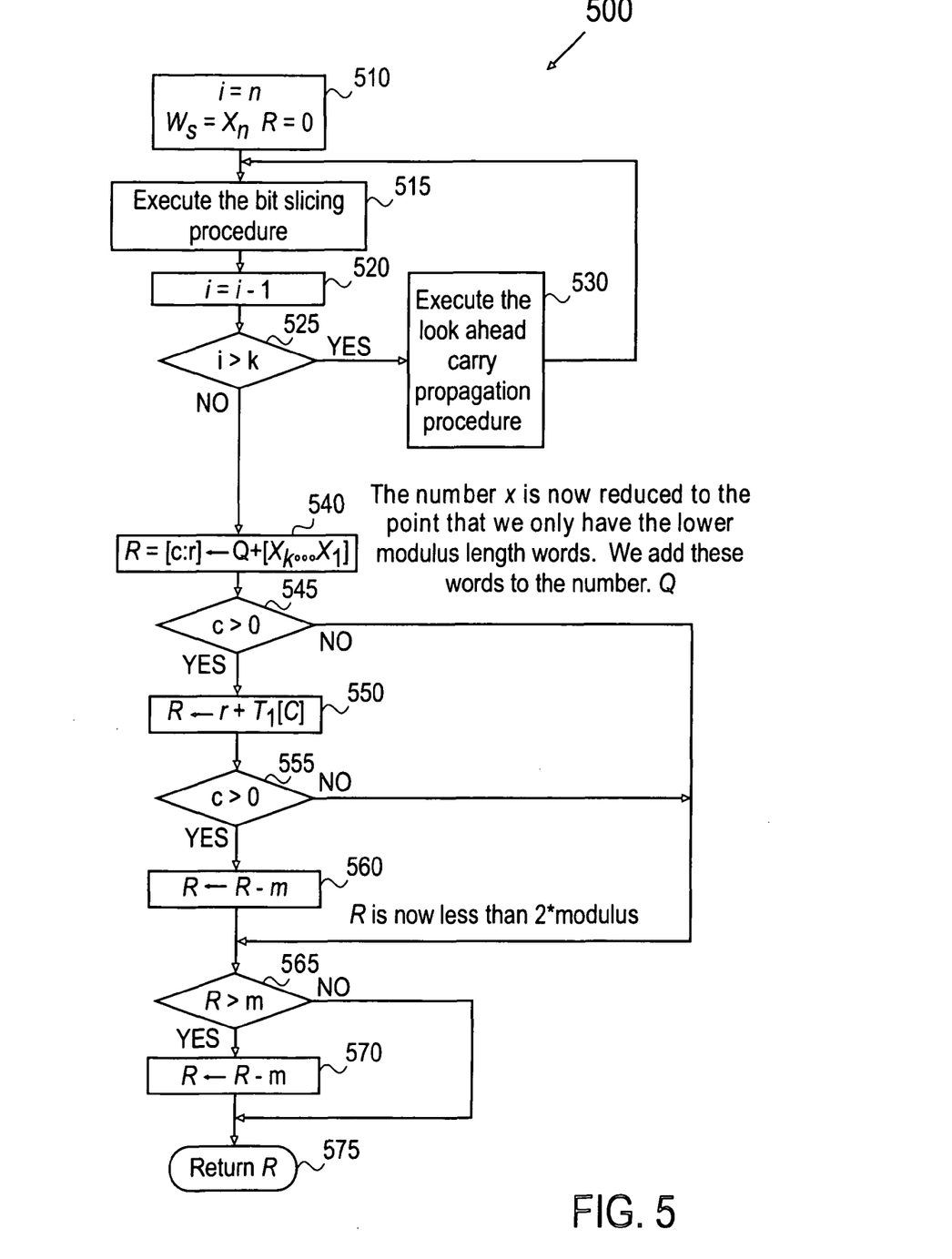
FIG. 5 illustrates a flow diagram combining the processes from FIG. 3 and FIG. 4.

This embodiment is illustrated in FIGS. 2, 3, 4 and 5. FIG. 2 illustrates an input operand and modulus expressions. FIG. 3 illustrates a bit slicing procedure. FIG. 4 illustrates a 'look-ahead' carry propagation procedure which is used for calculating the contribution of carry values to the generation of the final remainder. FIG. 5 illustrates a flow diagram which combines the bit slicing and look-ahead carry propagation procedures in a while loop.

As illustrated in FIG. 3, the bit slicing process operates on a word $w_s$ and a big number value R=[c:r] where c is 1 bit long and r is k words long. The value $w_s$ represents the current word from the input number, which is taken into account. In one embodiment, it is this word $w_s$ that is sliced and used for performing parallel table lookups. The big number R represents a remainder 'tail' produced in the previous iteration of the algorithm's main loop as shown in FIG. 5. The remainder tail R is produced by the 'look-ahead' carry propagation procedure of FIG. 4. The word value $w_s$ is initialized to the most significant word $x_n$ of the input. The remainder tail R is initialized to zero.

The bit slicing procedure splits the word $w_s$ into 8 slices of 8 bits each. We refer to these slices as $w_s^{(1)}, w_x^{(2)}, \ldots, w_s^{(8)}$ respectively:

$$w_s = [w_s^{(8)}: w_s^{(7)}: \ldots : w_s^{(1)}]$$

Each of the slices is used as an index for accessing a different lookup table. In one embodiment eight lookup tables are used $T_1, T_2, \ldots, T_8$. Each of the tables has 256 entries. Each entry is as long as the modulus m. Entry j of table $T_i$ stores the remainder from the division of the value j with the divisor m. The value j in the division is shifted by an offset specific to the table $T_i$. The offset value used for calculating table entries is equal to the length of the modulus 64k (in bits) for table $T_1$ and is increased by 8 bits for every next table $T_2, T_3, \ldots, T_8$: $T_i(j) = j \cdot 2^{64k+(i-1) \cdot 8} \mod m$.

The values of the entries returned from the table lookups are added to one another and with the remainder tail R. The result is a big number P shown in FIG. 3. In the identity $$P = [p_c : P_v] \leftarrow \sum_{i=1}^{8} T_i(w_s^{(i)}) + [c:r],$$

the big number $P_v$ is 64k bits long (same as the modulus m), whereas the value $p_c$ represents accumulated carry values resulting from the additions of the table entries and the tail R. The value $p_c$ is at most 9 and can fit into a single byte.

In one embodiment, since the number P may be at most 64k+4 bits long, the bit slicing process further reduces this value so it is not longer than 64k+1 bits. To do this reduction the bit slicing process performs one more table lookup using table $T_1$ and the value $p_c$ as an index:

Q=[$q_c$: $Q_v$]←$P_v$+$T_1(p_c)$. The number $Q_v$ is 64k bits long, as the modulus m, whereas the value $q_c$ represents the carry value resulting from the addition of the table entry $T_1(p_c)$ to the big number $P_v$. The bit slicing process ends with the calculation of the big number Q. It is proven analytically that Q is congruent to the sum of the word $w_s$ shifted by 64k bits to the left and the tail R (modulus m): Q≡($w_s \cdot 2^{64k}$+r) (mod m)

In this embodiment Q differs from the remainder ($w_s \cdot 2^{64k}$+R)mod m by at most 2m. This is because the big number $P_v$ is less than two times the modulus m (since it is exactly 64k bits long and m has the most significant bit set to 1) and because the table entry $T_1(p_c)$ is less than m. The bit slicing process essentially substitutes the word $w_s$ and the previous tail R with the number Q. The contribution of the $w_s$ and the previous tail R for the calculation of the final remainder value is the same as Q.

In one embodiment the bit slicing process is used in a loop reading a new word from the input number x in every iteration. In one embodiment the iteration is performed in a straightforward way. The number Q is further reduced mod m by subtracting the modulus m from Q at most two times. Then Q is added to the most significant words of x that have not yet been taken into account. Then the bit slicing process is repeated by setting $w_s$ to the most significant word from x (after the addition of Q) that has not been used in the bit slicing procedure yet and the tail R to zero. In one embodiment, process 500 (see FIG. 5) incurs the cost of several big number subtractions after every bit slicing step.

In one embodiment the tables used are populated with the modular reduction of words that are at an offset one greater than the modulus length (k) in words. The input number that are considered in process 500 (see FIG. 5) are at offsets greater than one greater than the modulus length (k) in words in the input number. In one embodiment the following property is used: A * x mod N≡(A mod N * x)(mod N).

For example, consider the most significant word in the input. We can view the value of the input word $x_n$ as follows: Placevalue $(x_n) = x_n \cdot 2^{64(n-1)} = x_n \cdot 2^{64(k+n-l-k)} = x_n \cdot 2^{64k} \cdot 2^{64(n-l-k)}$.

To obtain Placevalue $(x_n)$ mod m, we get the modulus results for $x_n 2^{64k}$ from the values stored in our tables. We then need to left shift the result by n-l-k words and perform another mod to get the correct contribution of this word in the final result (from identities 8 and 9). In one embodiment, the same effect is achieved by shifting the result by a word in each iteration of the main loop. Each time this is done a word from the k word result from the table lookup for $x_n * 2^{64k}$ is determined, that will be at the correct offset so that the tables can be used again to determine its mod value.

In another embodiment, no intermediate big number subtractions are performed. This is accomplished by using a 'look ahead' carry propagation procedure, as illustrated in FIG. 4. An important part of this procedure is that carry values resulting from the bit slicing procedure can be substituted with appropriate big numbers. In this embodiment, no further subtractions are necessary for eliminating the carry values. The look ahead carry propagation procedure begins by adding the most significant word $q_k$ of the big number $Q_v$ with the next word from x, which is taken into account. Assume that $Q_v = [q_k \, q_{k-1} \ldots q_1]$. In the first iteration of the process illustrated in FIG. 5, the next word from x taken into account is $x_{n-1}$. In the second iteration the next word taken into account is $x_{n-2}$ and so on. Using a loop variable i (initialized to n and counted down), the next word to be taken into account is $x_{i-i}$. The look ahead carry propagation procedure adds the word $x_{i-1}$ to the word $q_k$ producing the value of $w_s$, which is used in the next iteration of the bit slicing procedure. This addition also produces a carry value $w_c$: $[w_c: w_s] \leftarrow q_k + x_{i-1}$.

To get rid of the carry values $q_c$ (from $Q = [q_c: Q_v] \leftarrow P_v + T_1(p_c)$) and $w_c$ (from Placevalue $(x_n) = x_n \cdot 2^{64(n-1)} = x_n \cdot 2^{64(k+n-l-k)} = x_n \cdot 2^{64k} \cdot 2^{64(n-l-k)}$) the look ahead carry propagation procedure adds these two carry values producing a sum $s_c$. $s_c \leftarrow w_c + q_c$.

It should be noted that the sum $s_c$ is 0 or 1 or 2. If the sum $s_c$ is zero (0) no carries need to be taken into account. If $s_c$ is not zero, however, then one embodiment performs a last table lookup. The index used for performing the table lookup is $s_c$. The table used for the final lookup $T_c$ only has two entries. One entry corresponds to the value $s_c=1$, whereas the other entry corresponds to the value $s_c=2$. Each of the entries of $T_c$ is k words long. Table $T_c$ stores 2 pre-computed remainders from the division of $s_c$ shifted by an offset to the left with the modulus m. The offset used is k+1 words: $T_c(i) = i \cdot 2^{(k+1) \cdot 64}$ mod m where i∈[1,2].

It can be seen from $T_c(i) = i \cdot 2^{(k+1) \cdot 64}$ mod m, where i ∈[1,2], that the carry propagation procedure illustrated in FIG. 4 looks ahead one word more than the bit slicing procedure, hence the term 'look ahead' carry propagation. This is done for the carry propagation procedure to calculate the correct remainder tail R used in the next iteration of the process's main loop. The value of R used in the next bit slicing iteration results from adding the table entry $T_c(s_c)$ with the k-1 least significant words of $Q_v$ that have not yet been taken into account:

$$R = [c:r] \leftarrow T_c(s_c) + [q_{k-1} \, q_{k-2} \ldots q_1] \cdot 2^{64}.$$

The look-ahead carry propagation procedure ends with the derivation of the tail value R. The sequence of the bit slicing and look-ahead carry propagation procedures is repeated until all n-k most significant words of x have been taken into account. The last part of process involves a number of subtractions to further reduce the remaining tail so that the resulting remainder is less than m.

FIG. 5 illustrates process 500 including the bit slicing process (illustrated in FIG. 3) and the look ahead carry propagation process (illustrated in FIG. 4) in a reduction loop. Block 510 initializes process 500 with i=n, $w_s=X_n$, and R=0. Block 515 executes the bit slicing process illustrated in FIG. 3. Block 520 sets i=i-1.

Block 525 determines if i is greater than k. If it is determined that i is greater than the value of k, process 500 continues with block 530 where the look ahead carry propagation process illustrated in FIG. 4 is executed. If it is determined that the value of i is not greater than the value of k, then process 500 continues with block 540.

In block 540, the following is determined: R=[c:r]←Q+ [$X_k \ldots X_1$]. In block 540 X is now reduced to the point that the lower modulus length words. These words are added to the number Q. Process 500 continues with block 545. In block 545 it is determined whether the value of c is greater than 0. If it is determined that the value of c is greater than 0, process 500 continues with block 550. If it is determined that the value of c is not greater than 0, process 500 continues with block 565.

In block 550, the following is determined: R←r+$T_1$[c]. Process 500 continues with block 555. In block 555 it is determined whether the value of c is greater than 0. If the value of c is greater than 0, process 500 continues with block 560. If it is determined that the value of c is not greater than 0, process 500 continues with block 565. In block 560, the following is determined: R←R-m. That is the value of R is now less than 2* modulus.

In block 565 it is determined whether the value of R is greater than the value of m. If it is determined that the value of R is greater than the value of m, process 500 continues with block 570. If it is determined that the value of R is not greater than the value of m, process 500 continues with block 575 where the value of R is returned from process 500. In block 570, the following is determined: R←R-m. Process 500 continues then with block 575. In one embodiment, process 500 is used to carryout calculations used by a cryptographic process, such as an RSA process.

Figure 6:
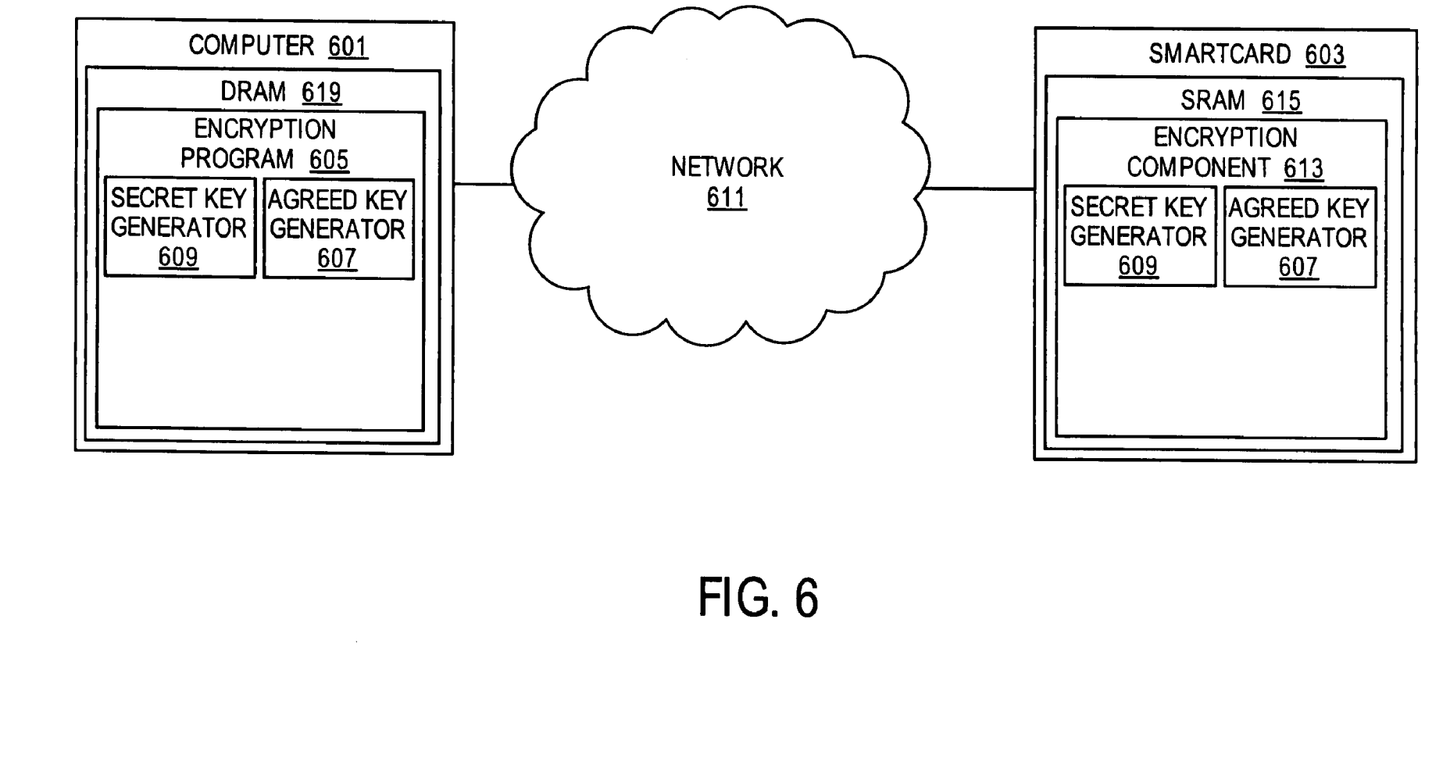
FIG. 6 illustrates an embodiment of an apparatus and system.

Embodiments of the present invention may be implemented using hardware, software, or a combination thereof and may be implemented in one or more computer systems or other processing systems. In one embodiment, the invention is directed toward one or more computer systems capable of carrying out the functionality described herein. In another embodiment, the invention is directed to a computing device. An example of a computing device 601 is illustrated in FIG. 6. Various embodiments are described in terms of this example of device 601, however other computer systems or computer architectures may be used.

FIG. 6 is a diagram of one embodiment of a device utilizing an optimized encryption system. The system may include two devices that are attempting to communicate with one another securely. Any type of devices capable of communication may utilize the system. For example, the system may include a first computer 601 attempting to communicate securely with a smartcard 603. Devices that use the optimized encryption system may include, computers, handheld devices, cellular phones, gaming consoles, wireless devices, smartcards and other similar devices. Any combination of these devices may communicate using the system.

Each device may include or execute an encryption program 605. The encryption program 605 may be a software application, firmware, an embedded program, hardware or similarly implemented program. The program may be stored in a non-volatile memory or storage device or may be hardwired. For example, a software encryption program 605 may be stored in system memory 619 during use and on a hard drive or similar non-volatile storage.

System memory may be local random access memory (RAM), static RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, RDRAM® (Rambus®) dynamic random access memory), SDRAM (synchronous dynamic random access memory), DDR (double data rate) SDRAM, DDRn (i.e., n=2, 3, 4, etc.), etc., and may also include a secondary memory (not shown).

The secondary memory may include, for example, a hard disk drive and/or a removable storage drive, representing a floppy disk drive, a magnetic tape drive, an optical disk drive, etc. The removable storage drive reads from and/or writes to a removable storage unit. The removable storage unit represents a floppy disk, magnetic tape, optical disk, etc., which is read by and written to by the removable storage drive. As will be appreciated, the removable storage unit may include a machine readable storage medium having stored therein computer software and/or data.

The encryption program 605 may utilize any encryption protocol including SSL (secure sockets layer), IPsec, Station-to-Station and similar protocols. In one example embodiment, the encryption program may include a Diffie-Hellman key-exchange protocol, an RSA or modified RSA encryption/decryption algorithm.

The encryption program 605 may include a secret key generator 609 component that generates a secret key for a key-exchange protocol. The encryption program 609 may also include an agreed key generator 607 component. The agreed key generator 607 may utilize the secret key from the encryption component 613 of the device 603 in communication with the computer 601 running the encryption program 605. Both the secret key generator 609 and the agreed key generator 607 may also utilize a public prime number and a public base or generator. The public prime and base or generator are shared between the two communicating devices (i.e., computer 601 and smartcard 603).

The encryption program may be used for communication with devices over a network 611. The network 611 may be a local area network (LAN), wide area network (WAN) or similar network. The network 611 may utilize any communication medium or protocol. In one example embodiment, the network 611 may be the Internet. In another embodiment, the devices may communicate over a direct link including wireless direct communications.

Device 601 may also include a communications interface (not shown). The communications interface allows software and data to be transferred between computer 601 and external devices (such as smartcard 603). Examples of communications interfaces may include a modem, a network interface (such as an Ethernet card), a communications port, a PCMCIA (personal computer memory card international association) slot and card, a wireless LAN interface, etc. Software and data transferred via the communications interface are in the form of signals which may be electronic, electromagnetic, optical or other signals capable of being received by the communications interface. These signals are provided to the communications interface via a communications path (i.e., channel). The channel carries the signals and may be implemented using wire or cable, fiber optics, a phone line, a cellular phone link, a wireless link, and other communications channels.

In one example embodiment, an encryption component 613 may be part of a smartcard 603 or similar device. The encryption component 613 may be software stored or embedded on a SRAM 615, implemented in hardware or similarly implemented. The encryption component may include a secret key generator 609 and agreed key generator 607.

In alternative embodiments, the secondary memory may include other ways to allow computer programs or other instructions to be loaded into device 601, for example, a removable storage unit and an interface. Examples may include a program cartridge and cartridge interface (such as that found in video game devices), a removable memory chip or card (such as an EPROM (erasable programmable read-only memory), PROM (programmable read-only memory), or flash memory) and associated socket, and other removable storage units and interfaces which allow software and data to be transferred from the removable storage unit to device 601.

In this document, the term "computer program product" may refer to the removable storage units, and signals. These computer program products allow software to be provided to device 601. Embodiments of the invention may be directed to such computer program products. Computer programs (also called computer control logic) are stored in memory 619, and/or the secondary memory and/or in computer program products. Computer programs may also be received via the communications interface. Such computer programs, when executed, enable device 601 to perform features of embodiments of the present invention as discussed herein. In particular, the computer programs, when executed, enable computer 601 to perform the features of embodiments of the present invention. Such features may represent parts or the entire blocks of process 500 illustrated in FIG. 5. Alternatively, such computer programs may represent controllers of computer 601.

In an embodiment where the invention is implemented using software, the software may be stored in a computer program product and loaded into device 601 using the removable storage drive, a hard drive or a communications interface. The control logic (software), when executed by computer 601, causes computer 601 to perform functions described herein.

Computer 601 and smartcard 603 may include a display (not shown) for displaying various graphical user interfaces (GUIs) and user displays. The display can be an analog electronic display, a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), etc.

In another embodiment, the invention is implemented primarily in hardware using, for example, hardware components such as application specific integrated circuits (ASICs) using hardware state machine(s) to perform the functions described herein. In yet another embodiment, the invention is implemented using a combination of both hardware and software.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A method for a computer having a processor and a memory, the method comprising:
    determining with the processor a first product for a portion of a first operand and a portion of a second operand located in the memory;
    prefixing the first product with selected bits;
    determining a second product from the prefixed first product;
    performing a bit slicing procedure to produce a product P from eight word values $w_s$ and eight lookup tables $T_i$, as follows:

$$P = [p_c : P_v] \leftarrow \sum_{i=1}^{8} T_i(w_s^{(i)}) + [c : r]$$

wherein the value $p_c$ represents accumulated carry values resulting from the additions of the lookup tables and the tail R=[c:r] where c is 1 bit long and r is k words long;
    performing modular reduction of the second product; and
    providing the reduced second product to a multiplication portion of an encryption process.

2. The method of claim 1, wherein the portion of the first operand is the least significant bits of the first operand, and the portion of the second operand is the least significant bits of the second operand.

3. The method of claim 1, wherein the performing modular reduction includes: performing a bit slicing procedure for the second product; and performing look ahead propagation procedure on the sliced bits.

4. The method of claim 1, further comprising: performing reduction of the second product with subtraction.

5. An apparatus comprising:
    a computer coupled to a memory, the computer to execute an encryption program in the memory, the encryption program including an incremental modular multiplication portion to calculate a first product, the incremental modular multiplication portion to calculate a second product from a prefixed first product;
    a modular reduction portion to reduce the second product and perform a bit slicing procedure to produce a product P from eight word values $w_s$ and eight lookup tables $T_i$ as follows:

$$P = [p_c : P_v] \leftarrow \sum_{i=1}^{8} T_i(w_s^{(i)}) + [c : r]$$

wherein the value $p_c$ represents accumulated carry values resulting from the additions of the lookup tables and the tail R=[c:r] where c is 1 bit long and r is k words long, and
    to provide the reduced second product to a multiplication portion of the encryption program to generate encryption keys.

6. The apparatus of claim 5, wherein the encryption program to perform a bit slicing procedure for the second product; and to perform a look ahead propagation procedure on the sliced bits.

7. The apparatus of claim 6, wherein the computer is included in one of a smartcard, a personal digital assistant (PDA), a cellular telephone and a gaming console.

8. A machine-readable storage medium containing instructions that, when executed, cause a machine to:
- determine a first product for a portion of a first operand and a portion of a second operand;
- prefix the first product with selected bits;
- determine a second product from the prefixed first product;
- perform a bit slicing procedure to produce a product P from eight word values $w_s$ and eight lookup tables $T_i$ as follows:

$$P = [p_c : P_v] \leftarrow \sum_{i=1}^{8} T_i(w_s^{(i)}) + [c:r]$$

wherein the value $p_c$ represents accumulated carry values resulting from the additions of the lookup tables and the tail $R=[c:r]$ where c is 1 bit long and r is k words long;
- perform modular reduction of the second product; and
- provide the reduced second product to a multiplication portion of an encryption process.

9. The machine-readable storage medium of claim 8, wherein the portion of the first operand is the least significant bits of the first operand, and the portion of the second operand is the least significant bits of the second operand.

10. The machine-readable storage medium of claim 8, wherein the perform modular reduction includes: performing a bit slicing procedure for the second product; and performing look ahead propagation procedure on the sliced bits.

11. The machine-readable storage medium of claim 8, further containing instructions that, when executed, cause a machine to: perform reduction of the second product with subtraction.

12. A system comprising:
- a first device coupled to a first memory, the first device to execute an encryption program in the first memory, the encryption program including an incremental modular multiplication portion to calculate a first product, the incremental modular multiplication portion to calculate a second product from a prefixed first product;
- a modular reduction portion to reduce the second product and perform a bit slicing procedure to produce a product P from eight word values $w_s$ and eight lookup tables $T_i$ as follows:

$$P = [p_c : P_v] \leftarrow \sum_{i=1}^{8} T_i(w_s^{(i)}) + [c:r]$$

wherein the value $p_c$ represents accumulated carry values resulting from the additions of the lookup tables and the tail $R=[c:r]$ where c is 1 bit long and r is k words long, and
- to provide the reduced second product to a multiplication portion of the encryption program to generate encryption a first encryption key and a second encryption key; and
- a second device coupled to a second memory, the second device to execute the encryption program in the second memory, wherein the first device and the second device transfer encrypted data to one another over a network.

13. The system of claim 12, wherein the first memory is a double data rate (DDRn) synchronous dynamic random access memory (SDRAM), wherein n is an integer equal to or greater than 2.

14. The system of claim 12, wherein the network is one of a wired and wireless.

15. The system of claim 12, wherein the second device is one of a smartcard, a personal digital assistant (PDA), a cellular telephone and a gaming console.

16. The system of claim 12, wherein the encryption program to perform a bit slicing procedure for the second product; and to perform a look ahead propagation procedure on the sliced bits.

17. The system of claim 12, further including a display to provide a graphical representation of the encryption program.

18. The method of claim 1, further comprising performing a look ahead carry propagation procedure to remove carry values $q_c$ from $Q=[q_c:Q_{v]\leftarrow Pv}+T_i(p_c)$ and $w_c[w_c:w_s]\leftarrow q_k+x_{i-1}$ by adding $q_c$ and $w_c$ to produce a sum $s_c\leftarrow w_c+q_c$.

19. The apparatus of claim 5, wherein the modular reduction portion further comprises perform a look ahead carry propagation procedure to remove carry values $q_c$ from $Q=[q_c:Q_{v]\leftarrow Pv}+T_i(p_c)$ and $w_c[w_c:w_s]\leftarrow q_k+x_{i-1}$ by adding $q_c$ and $w_c$ to produce a sum $s_c\leftarrow w_c+q_c$.

20. The machine-readable storage medium of claim 8, further comprising perform a look ahead carry propagation procedure to remove carry values $q_c$ from $Q=[q_c:Q_{v]\leftarrow Pv}+T_l(p_c)$ and $w_c[w_c:w_s]\leftarrow q_k+x_{i-1}$ by adding $q_c$ and $w_c$ to produce a sum $s_c\leftarrow w_c+q_c$.

21. The system of claim 12, wherein the modular reduction portion further comprises perform a look ahead carry propagation procedure to remove carry values $q_c$ from $Q=[q_c:Q_v]\leftarrow P_v+T_i(p_c)$ and $w_c[w_c:w_s]\leftarrow q_k+x_{i-1}$ by adding $q_c$ and $w_c$ to produce a sum $s_c\leftarrow w_c+q_c$.

* * * * *